Patented Apr. 28, 1936

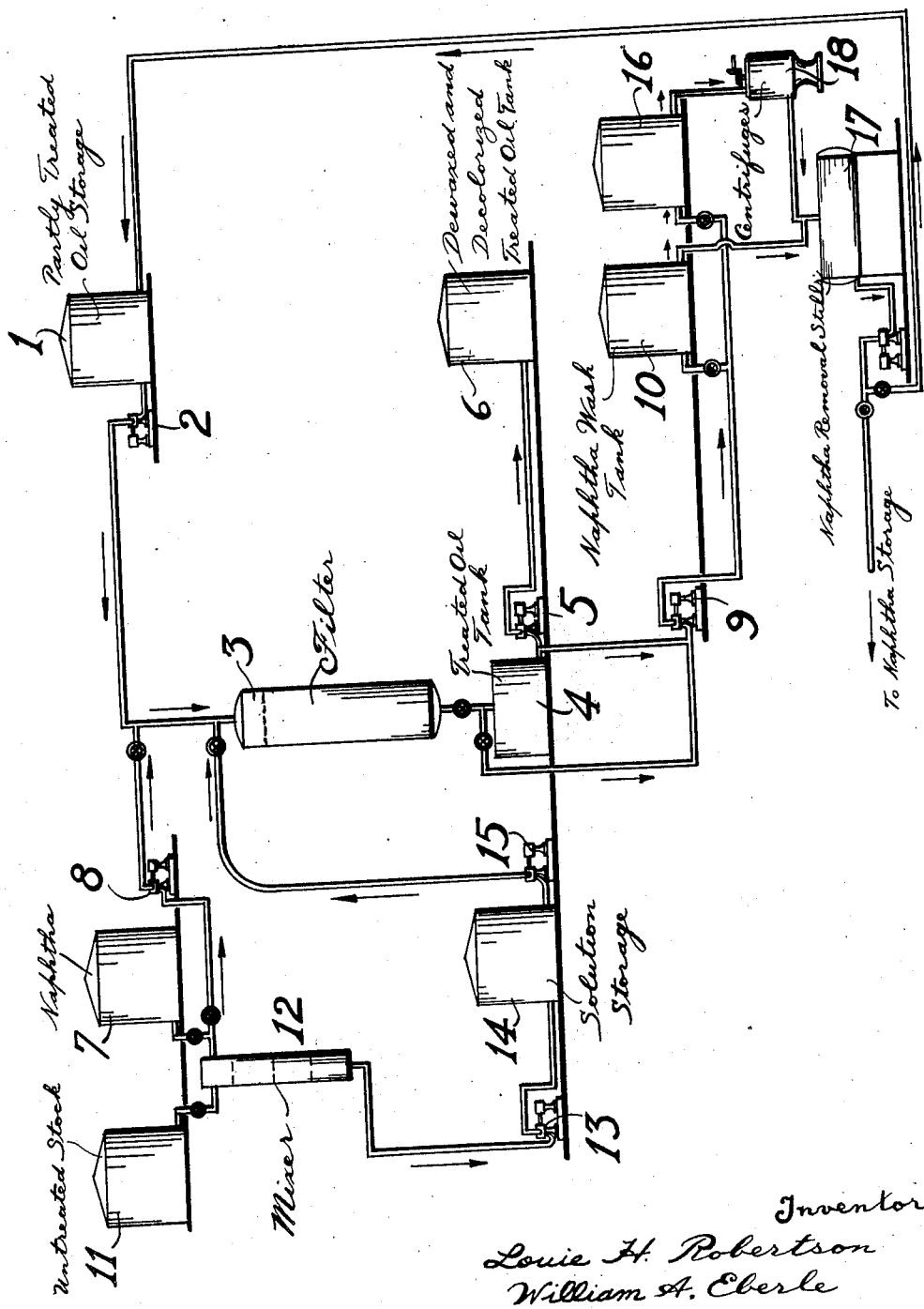

2,038,604

UNITED STATES PATENT OFFICE 2,038,604

PROCESS FOR TREATING LUBRICATING OILS

Louie H. Robertson, Elizabeth, and William A. Eberle, Jersey City, N. J., assignors to Standard Oil Development Company, a corporation of Delaware Application December 21, 1931, Serial No. 582,220

6 Claims. (Cl. 196—147)

This invention relates to an improvement in the process for treating lubricating oil stocks, especially residual cylinder oil stocks with clay by the so-called percolating filtration method. It will be fully understood from the following description when read in conjunction with the drawing, the sole figure of which is a diagrammatic representation, partly in section, of the apparatus used for carrying out this invention.

It is usual in the production of lubricating oils, especially cylinder oils, to obtain the desired color by percolation through a deep bed of coarse solid adsorbent material. Fuller's earth is the variety best known to be used for this purpose although other solid adsorbent and decolorizing materials, such as charcoal, may also be used. In such a process the surface of the clay or other adsorbent becomes exhausted after a certain amount of oil has been percolated and then it is necessary to stop the percolation, wash out the soakage oil remaining in the clay with naphtha or other solvent and burn the clay to regenerate its activity. The amount of soakage oil remaining in the bed of adsorbent material after filtrate of the required color has been obtained is a function of the quantity of adsorbent material used and likewise a function of the color of the stock and the color of the finished product. Thus the soakage oil may vary from less than 100% of the total throughput as an upper limit to a lower limit which may approach zero percent. In practice the percentage range of soakage oil varies from about 80% to about 5%, depending upon the coloring matter which must be removed by the adsorbent material. If a dark colored stock is filtered to a light color, therefore, the yield of treated oil is greatly lowered by soakage.

It has also been usual to dilute the oil to be treated with about twice its volume of light naphtha having a boiling point range of say between 200 and 350° F. and to percolate this solution through the bed of solid adsorbent material at temperatures below 200° F. The solution of treated lubricating oil in the naphtha is then submitted to distillation to remove the naphtha from the lubricating oil. After the decolorizing power of the clay is exhausted the soakage oil, consisting of a mixture of naphtha and the lubricating oil, is washed out with naphtha, the clay dried and burned to regenerate its activity. In such a process the percentage of lubricating oil in the soakage remaining in the percolation unit is much smaller in terms of total throughput but the cast of the treated oil is not satisfactory.

We have discovered a process to be described hereinafter in more detail by which these disadvantages of the prior percolation processes can be eliminated.

One object of our invention is to increase the throughput of percolation filtration units.

Another object is to provide a process which gives a lubricating oil of excellent cast and color stability.

Other objects and advantages will be apparent in the course of the description.

Referring now to the drawing, the same will be described together with the process as applied to the treatment of residual cylinder oil stocks, although it is apparent that it may be used for the treatment of other lubricating oil stocks as well.

Partly treated oil in storage 1 passes through pump 2 and through filter 3 containing fresh adsorbent material. Treated oil is collected in run-down tank 4 and passes through pump 5 into treated oil (dewaxed and decolorized) storage tank 6.

Solvent such as naphtha from storage tank 7 passes through pump 8 and into filter 3 from which soakage oil and solvent are removed and passed through pump 9 into the naphtha wash storage tank 10.

Untreated stock from storage tank 11 is mixed with solvent from solvent storage 7 in mixer 12 and passed through pump 13 into solution storage 14. Solution from storage 14 passes through pump 15 and into filter 3 where substantially the remainder of the decolorizing power of the adsorbent material is exhausted. Partly treated solution passes through pump 9 into partly treated solution storage 16.

Solvent wash passes from storage 10 to naphtha removal stills 17 from which partly treated oil is pumped to storage 1. Partly treated solution 16 is dewaxed in centrifuges 18 and after naphtha removal partly treated oil is pumped to storage 1.

The partially treated and dewaxed oil is passed through the fresh adsorbent material at a temperature higher than 200° F., say at about 225° F. The solvent used in the process is usually a naphtha, of say 50 to 60° A. P. I., having an approximate boiling range of 200 to 350° F. The oil solution for tank 14 is usually made up in the proportion of 65 parts by volume of naphtha and 35 parts by volume of the cylinder stock or lubricating oil stock to be treated. The oil solution is passed through the partially exhausted decolorizing material at a temperature between, say 125° F. to 140° F. This solution is passed through the clay in such an amount that a filtered solution of 3R. dilute color is obtained. The clay is totally exhausted and for further practical filtering operation it must be washed with naphtha and regenerated by burning to obtain fresh clay. The color of the filtered solution is determined by evaporating the solvent from the naphtha, dissolving 15 parts of the residual oil in 85 parts by volume of 22 Saybolt color water white distillate and determining the so-called dilute color. When this color is 3 Robinson the passing of the solution through filter 3 is ended as described above.

The dewaxing of the partially treated oil solution stored in tank 16 may be carried out by chilling the solution to a temperature of from 0° to −5° F. and passing the chilled solution to Sharples centrifuges. The dewaxed oil solution is then dried, that is freed from the naphtha, in a pipe still consisting of a heating coil and a tower into which the heated oil solution is discharged and from which the naphtha is removed as overhead product and the partially treated cylinder stock as bottoms.

It is apparent that our process gives a very high percentage yield of treated lubricating oil. It is also evident that the throughput through the treating unit is greatly increased because the oil submitted to straight filtration is already partially decolorized and, therefore, a large amount can be passed through before it is necessary to stop the straight percolation. The percentage of soakage based on the oil treated remaining in the treating unit in each cycle is consequently greatly reduced. This advantage becomes especially pronounced in the treatment of residual cylinder oil stocks since such stocks have a low color before the treatment.

Our process also allows a more thorough utilization of the clay because the clay used in the straight percolation is further used in the solution percolation step, whereby its decolorizing action is more exhausted when it is finally taken out of the cycle and degenerated.

Due to the circumstance that the hot percolation is the last treating step our process gives an oil with a much improved steam emulsion (R. E.) number than can be obtained in the usual solution percolation method in which the clay treating step is followed by storage, transfer and distillation steps, during which the oil may become contaminated with dust and similar materials increasing the steam emulsion number.

The color stability obtained by our process is just as good as that obtained in the usual solution percolation method and the cast of the lubricating oil obtained by our process is by far superior to the one obtained by prior percolation processes.

The following examples will illustrate our process:

A cylinder stock was treated according to the present process using 1 ton of clay per 15 bbls. (42's) oil. The filtration of 35 parts by volume of the stock and 65 parts by volume of the naphtha was carried out at a temperature of 135° F. to 3R. dilute color. The final filtration of the partially treated dewaxed and dried oil was carried out at a temperature of 220° F.

The following table shows the inspection data of the stock at various stages of the process:

| | Stock | 3 R. dilute dewaxed oil | Finished oil |
|---|---|---|---|
| Gravity, ° A. P. I | 22.3 | 22.5 | 22.8 |
| Flash, ° F | 555 | 555 | 555 |
| Visc. at 210° F | 205 | 200 | 200 |
| Cold test, ° F | 60 | 25 | 25 |
| Color | | | 1-¼ R. |
| R. E. (A. S. T. M. method) | | | 0.5 min. |
| Conradson carbon | | | 2.35% |
| Emulsion at 180° F | | | Passes. |

Another cylinder stock was divided in two portions, one portion treated according to the present process and the other portion by the usual solution filtration process. Both treatments were carried out to obtain 1¼ R. color. The following table shows the inspection data of the two treated oils and proves that our process gave a superior product:

| | Present process | Solution filtered oil |
|---|---|---|
| Gravity, ° A. P. I | 26.1 | 26.1 |
| Flash, ° F | 550 | 550 |
| Viscosity at 210° F | 150 | 152 |
| Cold test ° F | 25 P | 25 P. |
| Color | 1-¼ R | 1-¼ R. |
| Emulsion 180° F. (A. S. T. M. method) | Passes | Does not pass. |
| Demulsibility 180° F. (A. S. T. M. method) | 1,620 | 60. |
| R. E. (A. S. T. M. method) | ½ min | 10 min. |
| Conradson carbon | 1.58 | 1.60. |
| Resistivity at 85° C | 21.0×10¹⁰ ohm cms. | 3.1×10¹⁰ ohm cms. |
| Cast | Excellent | Fair. |
| Color stability (after keeping 75 ccs. in open 4 oz. bottle 16 hrs. at 175° F.) | 1-¼ R | 1-¼ R. |

Our process is not to be limited by any theory or by the specific details given for the better understanding of the process but only by the following claims in which it is our intention to claim all novelty inherent in the process:

We claim:
1. The process of treating a residual lubricating oil stock which comprises admixing the stock with a solvent and passing the solution through a deep layer of partially exhausted coarse solid adsorbent material, removing the solvent from the solution to obtain a partially treated lubricating oil stock and passing the partially treated stock through a deep layer of fresh coarse solid adsorbent material at a temperature above about 200° F., to obtain a treated oil and a partially exhausted coarse solid adsorbent material.

2. The process of treating a residual lubricating oil stock which comprises admixing the stock with a solvent and passing the solution through a deep layer of partially exhausted coarse solid adsorbent material, removing the solvent from the solution to obtain a partially treated lubricating oil stock and passing the partially treated stock through a deep layer of fresh coarse solid adsorbent material at a temperature between about 200 and 300° F. to obtain a treated oil and a partially exhausted coarse solid adsorbent material.

3. The process of treating a residual lubricating oil stock which comprises admixing the stock with a solvent, heating the solution to a temperature between 125° to 140° F., and passing the solution through a deep layer of partially exhausted coarse solid adsorbent material, removing the solvent from the solution to obtain a partially treated stock and passing the partially treated stock through a deep layer of fresh coarse solid adsorbent material at a temperature between about 200 and 250° F. to obtain a treated oil and a partially exhausted coarse solid adsorbent material.

4. The process according to claim 1 in which the solution of lubricating oil stock is dewaxed after its passage through the partially exhausted coarse solid adsorbent material.

5. Process according to claim 2 in which the solution of lubricating oil stock is dewaxed after its passage through the partially exhausted coarse solid adsorbent material.

6. Process according to claim 3 in which the solution of lubricating oil stock is dewaxed after its passage through the partially exhausted coarse solid adsorbent material.

LOUIE H. ROBERTSON.
WILLIAM A. EBERLE.